United States Patent [19]

Hartstein et al.

[11] 3,865,316

[45] Feb. 11, 1975

[54] PROCESS FOR MILLING DYES WITH STAUROLITE SAND

[75] Inventors: Eugene Fredrick Hartstein, Pennsville, N.J.; Ross Edward Kendall, Newark, Del.

[73] Assignee: E. I. du Pont de Nemours and Company, Wilmington, Del.

[22] Filed: Oct. 23, 1973

[21] Appl. No.: 408,582

[52] U.S. Cl. ............................................. 241/22
[51] Int. Cl. ............................................. B02c 17/00
[58] Field of Search ............. 241/15, 16, 21, 22, 30

[56] References Cited
UNITED STATES PATENTS

| | | | |
|---|---|---|---|
| 2,581,414 | 1/1952 | Hochberg | 241/22 |
| 3,309,030 | 3/1967 | Molls et al. | 241/21 |

*Primary Examiner*—Granville Y. Custer, Jr.
*Attorney, Agent, or Firm*—James A. Costello

[57] ABSTRACT

Disclosed herein is an improvement in the process of reducing the particle size of a dye dispersed in water by milling the dispersion in the presence of a grinding medium. The improvement resides in employing ferrous aluminum silicate sand as the grinding medium.

3 Claims, No Drawings

PROCESS FOR MILLING DYES WITH STAUROLITE SAND

BACKGROUND OF THE INVENTION

This invention concerns an improved process for reducing the particle size of water-dispersed dyes by grinding the dyes in the presence of staurolite sand which is ferrous aluminum silicate sand.

Heretofore, the art has taught silica sand, glass beads, quartz and similar small-sized media for grinding dyes. Ferrous aluminum silicate sand is known as a grinding medium for clays. However, concerning aluminum silicates and iron, such are taught by the art (U.S. Pat. No. 3,126,293) not to be suitable for grinding dyes.

It has now been found that staurolite sand not only is useful as a grinding medium for dyes but also leads to more efficient grinding than was heretofore possible in the art.

SUMMARY OF THE INVENTION

In a process for reducing the particle size of a water-dispersed dye comprising agitating the water-dispersed dye in the presence of a grinding medium, the improvement of this invention resides in employing ferrous aluminum silicate sand as the grinding medium.

The process of this invention can be operated in any of numerous apparatuses known in the art. Representative grinding apparatuses of the art include those of the following patents or obvious modifications thereof: U.S. Pat. Nos. 2,581,414; 2,855,156; 3,050,263; 3,075,710; 3,126,293; 3,149,789; 3,158,434; 3,215,353; 3,298,618; 3,309,030.

In the typical prior art process for milling dyes, a slurry of a dye and water is passed into a container, preferably continuously, where the dye and water is agitated together with a grinding medium until the particle size of the dye is appropriately reduced in size. Then, the resulting water-dispersed dye is removed (preferably continuously) from the container through a grinding media-retaining means.

Preferably, the process of this invention comprises introducing a slurry of a dye and water into the bottom of a vertically cylindrical container containing the dye, water, and staurolite sand; agitating the contents of the container by means of impellers along a rotating shaft extending generally along the container axis, which impellers impart to the staurolite sand a generally horizontal motion throughout the container; and continuously separating a dispersion of the dye and water from the top of the container, for example, by passing the dispersion through a sand-retaining screen or suppression plate surrounding all or a portion of the top of the container.

The staurolite sand which is employed as the grinding medium in the improved process of this invention contains more than about 50 percent and preferably more than about 70 percent by particle weight of the mineral staurolite, a ferrous aluminum silicate having the empirical formula $Fe_2Al_9O_7(SiO_4)_4(OH)$. It has a specific gravity of about 3.7 and a hardness of about 7 (Mohs' scale). Staurolite sands are commercially available, and operable in the process of this invention, in grades containing as little as 75 percent staurolite. Preferably, the staurolite sand that is employed contains a relatively wide range of particle sizes. The reasons for the advantage of employing a wide range of particle sizes in milling with staurolite sand are not known, but they may include a greater degree of classification of the grinding medium in the mill whereby the lower parts of the mixing zone in the mill contain relatively more of the larger particles and the upper parts of the mixing zone contain relatively more of the smaller particles of the grinding medium.

For best results, the size of the staurolite sand particles should be between about 105 to 1,000 microns in their largest dimension, corresponding to a U.S. Standard Sieve size of 140 to 18, respectively. Preferred sizes are from about 210 to 840 microns corresponding to U.S. Standard Sieve sizes of 70 to 20, respectively. It will be understood that such dimensions pertain to most of the sand particles, however, those skilled in the art will appreciate that not every sand particle will need to be within such ranges for operability.

DETAILS OF THE INVENTION

Typically, in starting up a continuous milling process in a vertically cylindrical, impeller, open top or closed top mill as described in U.S. Pat. No. 2,855,156, hereafter called Hochberg type, a mixture of water and sand is charged to the mill, agitation is started, additional sand is added to provide the desired ratio of sand volume to mill volume (usually between 30 and 65 percent sand based on total volume) and a previously mixed slurry of dye (disperse dye) in water is introduced into the bottom of the mill to begin milling of the dye. This mixture of dye, water, and other materials should, for economical operation, contain as high a proportion of dye as is practical. Such mixtures generally contain between about 5 and 40 percent dye and preferably contain between about 15 and 35 percent dye by volume.

When a sand mill of this type is under equilibrium continuous operating conditions, it preferably contains between about 45 percent and about 60 percent sand, between about 5 percent and about 20 percent dye, and between about 20 percent and about 50 percent water and other dissolved materials (all percentages by volume). With such mixtures in mills having agitated volumes of 20 to 60 gallons and 5 to 15 annular impellers having peripheral speeds between about 1,500 and about 2,500 feet per minute, the rate of introduction and removal of the dye slurry is usually in the range of 200 to 750 pounds per hours.

The maximum rate of throughput of aqueous dye pastes in closed-top mills of the Hochberg type is sometimes limited by the rate at which the resulting dye dispersion can be separated from the milling medium and removed from the mill through the filter screen at the top of the mill, but the practical rate of throughput in open-top mills of this design is more often determined by the time required to obtain the desired degree of dispersion. Lower throughput rates can be employed to obtain more fine dispersions of dyes, with correspondingly longer milling times, but in commercial production of dye dispersions, it is frequently preferable to pass each batch of dye at a higher rate through two or more mills in series or two or more times through the same mill. With silica sands as the grinding medium, many dye pastes are passed through sand mills three, four, or more times to obtain the fine dispersions required in commercially acceptable dye pastes. Any increase in mill throughput rate or any decrease in the number of passes through a mill required for the desired degree of dispersion decreases the total milling time and is, therefore, highly desirable.

The mixture of dye and water passed through a mill in continuous milling procedures of this type can contain dispersants, deagglomeration aids, foam suppressors, biocides, and other ingredients which either assist in the dispersion process, stabilize the resulting dispersion, or are desired in the resulting dispersion or in the dye powder or paste prepared therefrom.

In comparing the degree of dispersion of aqueous dye slurries obtained in milling, the slurries with staurolite sand and with silica sands under equivalent conditions, it has been found that staurolite sands are more effective than silica sands in reducing the size of the ultimate particles of disperse dyes and pigments. The reasons for the greater milling efficiency obtained with the staurolite sands are not completely understood. A factor which may be important, in addition to the greater density of staurolite sands and to any differences in milling efficiency which may be due to differences in particle size and in particle-size distribution, may be the different shapes of the particles of staurolite and silica sands.

The particles of silica sands have irregular but generally spherical shapes so that the ratio between the largest and the smallest dimensions of the particles of silica sands is seldom less than about 0.85. In contrast, the particles of staurolite sands tend to be more cylindrical in shape, i.e., they have one dimension substantially larger than two other more nearly equal dimensions. Large fractions (e.g., more than 50 percent) of the particles in a batch of staurolite sand frequently have a ratio of largest to smallest dimension less than about 0.75.

Surprisingly, insignificant amounts of soluble iron compounds are introduced into dye and pigment pastes by sand milling these pastes with staurolite sand as the milling medium, even though staurolite sands contain relatively large amounts of iron.

It has been found that the sand milling of aqueous slurries of disperse dyes and organic pigments usually involves not only deagglomeration but also a significant reduction in the size of the dye or pigment particles formed during chemical preparation of the dye or pigment. As prepared in aqueous slurries for sand milling, these materials are frequently in the form of ultimate particles between about 30 and about 50 microns in largest dimension (and may be up to 200 microns or more in largest dimension) which may be agglomerated into groups of particles up to about 500 microns in largest dimension. Currently commercially acceptable dye pastes contain few particles greater than about 10 microns in largest dimension, so the sand milling of dye slurries to obtain commercially acceptable pastes involves the reduction in size of a large fraction of the ultimate particles in the dye slurry introduced into the mill.

A significant difference in the efficiency of milling aqueous pastes of disperse dyes and pigments under comparable conditions with different milling media is considered to result in a difference in 1.5 microns or more in the largest dimension of dye particles having largest dimensions between about 5 and about 15 microns or a reduction by about 10 percent in the total milling time required in obtaining a dye paste containing substantially no dye particles having a largest dimension greater than any desired value between about 2 microns and about 10 microns.

With staurolite sand as the milling medium instead of silica sand, the process of this invention generally results in a reduction of more than 15 percent in the total milling time or of at least one in the number of passages through a sand mill required to obtain dye and pigment pastes containing particles between about 3 and about 10 microns in largest dimension. Average mill residence times of 45 to 100 minutes or more, typical of sand milling with silica sand, are frequently reduced to 20 to 75 minutes with staurolite sand.

Advantage can be taken of the increased milling efficiencies obtained with staurolite sands not only in greater throughput rates and/or reduced number of passes through mills, but also by increasing the concentration of the dye or pigment in the aqueous slurry introduced into a sand mill. A typical dye or pigment slurry for milling in an open-top, vertical sand mill of the Hochberg type employing silica sand as the milling medium has a viscosity of about 100 to about 300 centipoises. The resulting milled paste generally has a viscosity between about 500 and about 1,000 centipoises, but can sometimes have a viscosity as high as 2,000 or even 3,000 centipoises with optimum slurry formulation and mill operation conditions. It has been found practical, however, to produce equivalent dye pastes having viscosities greater by as much as 500 centipoises or more, with staurolite sands than with silica sands as the milling medium.

Such increases in dye paste viscosity can correspond to increase of as much as 5 percent or more in the concentration of dye or pigment in the slurry introduced into the mill, with a corresponding increase in mill productivity. Such increases in mill productivity are frequently in addition to the increased due to higher throughput rates and/or reduced number of passages through the mill, indicating that the increased milling efficiency obtained with staurolite sand in comparison with silica sand is enhanced in producing more viscous dye and pigment pastes.

Staurolite sand is also more effective than silica sand as the milling medium in closed-top, vertical mills in which the maximum rate of throughput of aqueous dye pastes is limited by the rate at which the resulting dye dispersion can be separated from the milling medium by the filter screens at the top of such mills. Dye pastes milled with staurolite sand pass through these filter screens at higher rates and with less blinding than is obtained with similar dye pastes milled with silica sands under comparable conditions. Staurolite sands, therefore, make practical the more efficient sand milling of dye pastes in closed-top sand mills than is possible with the larger synthetic beads of glass and zirconium oxide which are usually recommended as milling media in such mills.

Many dyes, as will be appreciated by those skilled in the art, can be efficiently dispersed in water in the improved process of this invention. Such dyes include the class known as disperse dyes. These dyes are substantially water-insoluble compositions usually of the azodiphenylamine or anthraquinone dye types, almost all of which are primary, secondary or tertiary amines of which the main types are aminoazobenzene, nitrodiarylamines and aminoanthraquinones. Vat dyes and organic pigments can also be efficiently dispersed in water by this improved process.

The following Examples and comparisons are meant to illustrate but not to limit this invention. In all comparisons, the dyes milled with staurolite sand were of commercially acceptable quality.

EXAMPLE 1

Duplicate sand millings compared the efficiency of milling with staurolite sand and with silica sand under substantially identical milling conditions.

An open-top laboratory stirring sand mill was operated continuously with about 55 volume percent grinding sand, about 15 volume percent C. I. Disperse Red 60 (a dye in the anthraquinone class) and about 30 volume percent water, dispersing aids, antifoam agent, and biocides. The mill had a working volume of about 1,600 milliliters, a central shaft with five dispersion discs rotating at 1,170 revolutions per minute, and an 80-mesh slotted screen attached to the upper rim of the mill container. A slurry containing about 33 volume percent dye and 66 volume percent water and other materials was passed into the bottom of the mill at the rate of about 75 milliliters per minute during a first pass and at a rate of about 56 milliliters per minute during a second pass.

With Staurolite Sand

Using a coarse staurolite sand of about 297 to 590 microns the dye paste after the first pass contained predominantly particles of dye 6 to 8 microns in largest diameter. After a second pass with the staurolite sand, the dye paste contained predominantly particles 3 to 4 microns in largest diameter.

With Silica Sand

Using a sawing-sand grade of silica sand of about 297 to 840 microns the dye paste after the first pass contained dye particles predominantly 8 to 10 microns in largest dimension. After a second pass the dye particles were predominantly 4 to 6 microns in largest dimension.

EXAMPLE 2

Duplicate sand millings determined the number of passes through a mill and the total milling time required to obtain a given dye particle size under substantially identical milling conditions using a staurolite sand and a silica sand.

The laboratory sand mill of Example 1 was charged with about 50 volume percent grinding sand, about 10 volume percent of C. I Disperse Blue 109, (a dye in the anthraquinone class) and about 40 volume percent water, dispersing aids, antifoam agent and biocides. A total of 3,600 grams of the slurry containing about 20 volume percent dye and about 80 volume percent water and other materials was passed through the mill as in Example 1 at rates of 85 to 100 milliliters per minute in sequential passes. Microscopic examination after each pass showed the dye particles to have predominantly particle sizes given in the Table after the indicated number of passes requiring the indicated times.

The total milling time required to obtain a paste containing particles predominantly less than three microns in largest dimension was 150 minutes and three passes with the staurolite sand and 190 minutes and four passes with the silica sand.

TABLE

Comparison of Staurolite and Silica Sands Regarding Efficiency

| After Pass | Coarse Staurolite Sand Dye Particle Size, Microns | Minutes Per Pass | Sawing Silica Sand Dye Particle Size, Microns | Minutes Per Pass |
|---|---|---|---|---|
| 1 | 8–10 | 45 | 8–10 | 48 |
| 2 | 4–6 | 60 | 6–8 | 42 |
| 3 | 1–2 | 45 | 4–6 | 50 |
| 4 | not necessary | | 1–3 | 50 |

EXAMPLE 3

A commercial size lot of C. I. Disperse Yellow 54 (a dye in the quinoline class) was milled at rates of 700 to 1,000 pounds per hour in a 60-gallon, closed-top sand mill of the Hochberg type using washed coarse-grade staurolite sand in an amount of nearly 50 percent of the free volume of the mill. After one pass through the mill, the dye paste contained particles predominantly 6 to 8 microns in largest dimension. After a second pass through the mill, the dye paste contained practically no particles having a largest dimension greater than 5 microns.

Attempts to grind this dye at equivalent rates in this 60-gallon, closed-top mill and in open-top sand mills of 30-gallon capacity using silica sawing sand size resulted in significant flotation of the sand and screen plugging and/or frequently required significantly greater milling times to obtain a commercially acceptable particle size.

EXAMPLE 4

In commercial production, a 30-gallon "Red Head" sand mill of the Hochberg type was employed to grind very efficiently each of the following art-known disperse dye pastes employing staurolite sand of from about 297 to 590 microns in size:

Yellow 54 (quinoline class)
Red 60 (anthraquinone class)
Blue 60 and 109 (both in anthraquinone class)
Violet 26 and 28 (both in anthraquinone class)
Orange 41 and 44 (monoazo dyes)
Red 55:1 (anthraquinone class).

The embodiments of the invention in which an exclusive property or privilege is claimed are defined as follows:

1. In a process for reducing the particle size of a water-dispersed dye comprising agitating the water-dispersed dye in the presence of a grinding medium, the improvement comprising employing, as the grinding medium, ferrous aluminum silicate sand in particle sizes between about 105 to 1,000 microns said ferrous aluminum silicate sand containing more than 50 percent by weight of staurolite having the empirical formula $Fe_2Al_9O_7(SiO_4)_4OH$, said staurolite having a specific gravity of about 3.7 and a Mohs scale hardness of about 7.

2. A process according to claim 1 comprising introducing a slurry of dye and water into a container containing ferrous aluminum silicate sand therein, agitating the dye, water and sand and continuously separating the dispersion of the dye and water from the sand.

3. A process according to claim 2 comprising introducing a slurry of dye and water into the bottom of a container containing ferrous aluminum silicate sand therein, agitating the dye, water and sand by imparting a generally horizontal motion of the sand, and continuously separating the dispersion of the dye and water from the sand at the top of the container.

* * * * *